March 24, 1959 R. D. FAGGE 2,879,373
SELF-ADAPTING SPOT WELDING GUN
Filed May 21, 1956
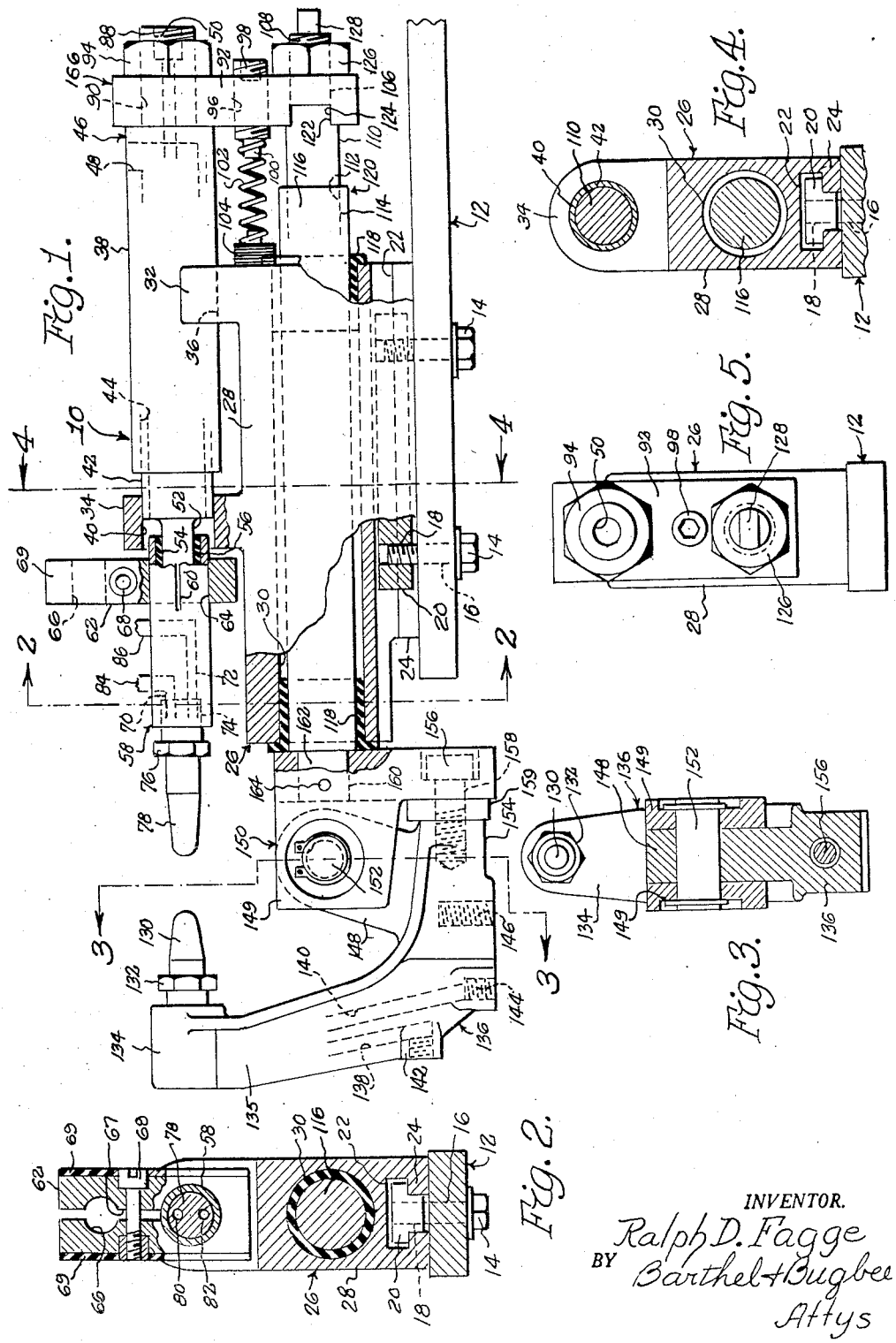
INVENTOR.
Ralph D. Fagge
BY Barthel+Bugbee
Attys United States Patent Office 2,879,373
Patented Mar. 24, 1959

2,879,373

SELF-ADAPTING SPOT WELDING GUN

Ralph D. Fagge, Detroit, Mich.; Sophie A. Fagge, administratrix of the estate of said Ralph D. Fagge, deceased Application May 21, 1956, Serial No. 586,029

3 Claims. (Cl. 219—89)

This invention relates to welding and, in particular, to spot welding guns.

One object of this invention is to provide a fixedly-mounted spot welding gun which is self-adapting to the position of the work, regardless of wear or erosion of the electrodes or for other reasons, thereby avoiding denting or deforming the sheet metal work being welded, as in prior fixedly-mounted spot welding guns.

Another object is to provide a fixedly-mounted spot welding gun of the foregoing character wherein the movable electrode is reciprocated by a piston mounted in a fluid pressure cylinder connected to a support for the fixed welding electrode, the support being loosely and slidably mounted in a bracket which in turn is secured to the table or other structure upon which the gun is arranged for presentation to the work.

Another object is to provide a fixedly-mounted spot welding gun, as set forth in the object immediately preceding, wherein the support includes relatively movable members adapted to adjustably lengthen or shorten the effective length of the support, thereby enabling the operator to compensate for wear or erosion of the electrodes or to enable their separation to be widened or narrowed.

Other objects and advantages of the invention will become apparent during the course of the following description of the accompanying drawings, wherein:

Figure 1 is a side elevation, partly in section, of a fixedly-mounted spot welding gun which is self-adapting to the workpiece, in accordance with one form of the invention;

Figure 2 is a vertical section taken along the line 2—2 in Figure 1;

Figure 3 is a vertical section taken along the line 3—3 in Figure 1;

Figure 4 is a vertical section taken along the line 4—4 in Figure 1; and

Figure 5 is a right-hand end elevation of the spot welding gun shown in Figure 1.

The present invention is concerned with so-called fixedly-mounted spot welding guns, also called fixture-type spot welding guns, wherein the work is brought to the location of the welding gun for welding, as distinguished from so-called portable spot welding guns which are brought to the location of the work to be welded. Hitherto, such fixedly-mounted or fixture-type spot welding guns have been so mounted upon their supporting structure that the abutment welding electrode is substantially immovable and unyielding. The result has been that the work has not always been in contact with the abutment electrode when the gun was about to be operated, as in the case where the abutment electrode had eroded so as to produce a gap between it and the workpiece, whereupon the supplying of pressure fluid to the fluid pressure cylinder operating the piston which in turn actuated the movable electrode, caused the movable electrode to push the work before it so as to close up the gap, halting only when the work came into contact with the abutment electrode. Under these circumstances, the thin sheet metal which was being spot-welded was dented or deformed by the force of the movable electrode, propelled by the fluid pressure piston, and the resulting damage caused financial loss to the manufacturer.

The spot-welding gun of the present invention prevents such damage by being constructed and arranged to be self-adapting to the workpiece, regardless of the relative positions of the workpiece and electrode and regardless of whether or not a gap exists between the abutment electrode and the workpiece. By the construction of the welding gun of the present invention, if the movable electrode engages the workpiece before the workpiece is in engagement with the abutment electrode, the workpiece will serve momentarily as an abutment and the reaction from the piston against the cylinder forces the cylinder mount carrying the abutment electrode in the opposite direction, so as to pull the abutment electrode up against the opposite side of the workpiece, whereupon welding occurs and no deformation or other damage is caused.

Referring to the drawings in detail, Figure 1 shows a fixedly-mounted spot welding gun, generally designated 10, according to one form of the invention as mounted upon and secured to a table 12 of a spot welding set-up of the type wherein several spot welding guns are arranged in predetermined locations upon a table so as to receive sheet metal workpieces of substantially the same construction in sequence in order to weld the workpieces on a mass production basis, one after the other. The fasteners 14 which secure the welding gun 10 to the table or other mounting structure 12 pass through holes 16 in the table 12 and their upper ends are threaded into threaded holes 18 in a clamping block or bar 20 of T-shaped cross-section (Figures 1 and 4) which in turn slidably engages a T-groove 22 in the bottom portion 24 of a bracket 26, the central portion 28 of which is provided with a longitudinal bore 30 and also with longitudinally-spaced upstanding guides 32 and 34 respectively. The guide 32 has a semi-cylindrical surface 36 therein which fits and slidably engages a fluid pressure cylinder 38, whereas the guide 34 has a cylindrical bore 40 which fits and slidably engages the piston 42 which in turn reciprocates in a bore 44 within the cylinder 38. The cylinder 38 and piston 42 collectively form a double-acting cylinder and piston unit or motor, generally designated 46, of any suitable type, the details of which are beyond the scope of the present invention. One such cylinder and piston unit which is suitable for this purpose is disclosed and claimed in my co-pending application Serial No. 485,547 filed February 1, 1955, for Fixture Type Spot Welding Gun. For supplying pressure fluid to the reciprocating motor 46, ports 48 and 50 are provided for connection by suitable pipes to a source of pressure fluid by way of a conventional control valve (not shown).

The piston 42 at its forward end is provided with a reduced diameter portion 52 which enters an insulating sleeve 54 seated in a bore or socket 56 in the rearward end of an approximately cylindrical movable electrode holder 58. The latter is of conducting material, such as copper, and is split as at 60 to be compressible upon the insulating sleeve 54 and reduced diameter portion 52 of the piston 42. Mounted on the electrode holder 58 adjacent the split rearward portion thereof is a welding cable connection terminal 62 having a bore 64 receiving the electrode holder 58 (Figures 1 and 2) and a bore 66 receiving the end of the welding cable (not shown). The terminal 62 between the bores 64 and 66 is split as at 67 to permit constriction of the bores 64 and 66, and a clamping screw 68 is provided for constriction purposes. Insulation layers 69 are provided on the sides of the terminal 62 (Figure 2).

The movable electrode holder 58 is provided with passageways 70 and 72 respectiveley leading to the end of a threaded socket 74 into which a tubular clamping nut 76 is threaded. The clamping nut 76 is bored to receive the shank of the movable welding electrode 78, which has cooling water passageways 80 and 82 therethrough aligned with the outlets of the passageways 70 and 72 respectively. Cooling water is conducted to the passageways 70 and 72 in the movable electrode holder 58 by pipes 84 and 86 respectively connected to a water system (not shown).

The rearward end of the cylinder 38 is reduced in diameter and threaded as at 88 to engage the bore 90 in a bridge bar 92 disposed transversely thereto and secured thereto by a nut 94 threaded upon the threaded portion 88 (Figure 1). The bridge bar 92 intermediate its upper and lower ends is provided with a threaded bore 96 adapted to receive a headless set screw 98, the reduced diameter nose 100 of which engages one end of a compression coil spring 102, the opposite end of which abuts a block 104 of insulating material secured to the central portion 28 of the bracket 26. In this manner, the spring 102 acts to urge the bridge bar 92 and the cylinder 38 rearwardly away from the bracket 26. The force of the spring 102 is adjustable by means of the set screw 98.

The lower end portion of the bridge bar 92 is bored as at 106 (Figure 1) to receive the reduced diameter threaded end portion 108 of a rearward shaft 110, the opposite end of which is threaded as at 112 into a threaded bore 114 of a forward shaft 116 which slidably engages a pair of flanged bushings 118 mounted in the opposite ends of the bore 30. The bushings 118 are conveniently made of the polymeric amide plastic known commercially as nylon, and serve not only as excellent wear members but also have electrical insulating properties. In this manner, the composite shaft, generally designated 120, made up of the extensible and retractible component shafts 110 and 116 is slidably mounted in the bracket 26. In order to prevent rotation of the rearward shaft 110 relatively to the bridge bar 92, the former is provided with cutaway flattened portions 122 and the latter with a transverse notch or groove 124 fitting therein. A nut 126 is threaded upon the threaded portion 108 of the rearward shaft 110, which rearwardly of the threaded portion 108 is provided with a flattened wrench-engaging portion 128 to which a wrench may be applied for rotating the shaft 110. In order to rotate the shaft 110, of course, it is first necessary to unscrew the nut 126 and push to the left on the end portion 128 in order to free the flattened locking portions 122 of the shaft 110 from their engagement with the groove 124. This construction enables the effective length of the composite shaft 120 to be increased or decreased in order to increase or decrease the spacing between the movable electrode 78 and the abutment electrode 130.

The abutment electrode 130, like its counterpart 78, is mounted in a tubular clamping nut 132, which in turn is threaded into an internally-threaded head 134 on the upper end of one arm 135 of an abutment electrode holder 136. The arm 135 is provided witth cooling water passageways 138 and 140 which lead to similar passageways within the head 134 and abutment welding electrode 130, as have been described in connection with the movable welding electrode 78 and its holder 58. These passageways 138 and 140 terminate in threaded bosses 142 and 144 for the connection of pipes leading to a cooling water system.

The abutment electrode holder 136 is approximately C-shaped, having an internally-threaded bore 146 for the attachment of the remaining welding cable and also having an upstanding arm 148 which is inserted between the spaced parallel ears 149 of a crosshead 150, these ears and the portion 148 being bored to receive a pivot pin 152 (Figure 3) by which the holder 136 may be swung around the pivot pin 152 as a fulcrum. The holder 136 immediately adjacent the base of the upstanding arm 148 is provided with a rearwardly-projecting boss 154 engaged by an adjusting clamping bolt 156 passing through a hole 158 in the cross-head 150 and also through a spacing washer or collar 159. The cross-head 150 immediately behind the ears 149 is provided with a socket 160 which receives the reduced diameter forward end portion 162 of the forward shaft 116 of the composite shaft 120 and is pinned or otherwise secured thereto as at 164. Thus, the bridge member 92, the composite shaft 120, the cross head 150 and the abutment electrode holder 136 collectively form a reciprocable support, generally designated 166, for the cylinder 38 and the abutment electrode 130 upon the adjustable bracket 26, which thus serves as a mounting structure or guide structure.

In the operation of the invention, let it be assumed that the welding gun 10 has been secured to the table 12, with or without a number of similar welding guns in a predetermined arrangement according to the shape of the workpieces to be welded, and that the bolts 14 have been tightened to clamp the bracket 26 to the table 12 when the bracket 26 has been properly positioned relatively to the location of the workpiece by means of the T-groove 22 and T-block 20. Let it also be assumed that the electrical and water connections have been made to the bores 66, 146 and pipe connections 84, 86, 142, 144 respectively and that the ports 48 and 50 of the cylinder 38 of the fluid pressure motor 46 have been connected to a pressure fluid supply and exhaust system, including a control valve therefor. Let it further be assumed that one of a number of identical workpieces to be welded has been moved into the space between the movable and abutment electrodes 78 and 130 in their retracted positions (Figure 1).

To make the weld and join the two pieces of sheet metal of the workpiece to one another, the operator then applies pressure fluid to the reciprocatory motor 46, such as, for example, hydraulic pressure, causing the piston 42, movable electrode holder 58 and movable electrode 78 to advance. The movable electrode 78, thus propelled by the piston 42, advances until it engages the workpiece, which is assumed to be in a relatively fixed position. If the abutment electrode 130, as it should be, is in engagement with the opposite side of the workpiece at the instant of contact of the movable electrode 78 with the workpiece, the sheet metal members of the workpiece are forced into tight engagement with one another at substantially the instant the electrical welding circuit is closed, generating intense heat and making the weld.

If, however, as eventually occurs, the abutment electrode 130 has eroded or otherwise worn away so as to leave a gap between it and the rearward surface of the workpiece, the arrival of the movable electrode 78 at the workpiece finds the latter without the abutment or anvil action of the abutment electrode 130. Under prior conditions, therefore, the movable electrode 78, impelled by the piston 42, would dent or deform the thin sheet metal of which the workpiece is composed. The present invention, however, now intervenes to prevent this damage to the workpiece.

In accordance with the present invention, when the advancing movable electrode 78 encounters the sheet metal workpiece, and a gap exists at the moment between the rearward surface of the workpiece and the abutment electrode 130, the workpiece acts as a temporary abutment, halting the movable electrode 78 because the reciprocable motor 46 is slidably mounted so as to be free to move in the opposite direction. As a consequence, the pressure fluid acting against the piston 42 within the cylinder 38 by reaction forces the cylinder 38 backward (to the right in Figure 1), carrying with it the reciprocable support 166 consisting of the bridge member 92, the composite shaft 120 connected thereto, the cross head 150, the abutment electrode holder 138 and the abutment electrode 130, the forward shaft portion 116 sliding to the right in the bushings 118 in the bracket 26. The abutment electrode 130 continues to move to the right with the reciprocable support 166 until it engages the rearward surface of the workpiece, whereupon the two electrodes 78 and 130 are squeezed together by the reciprocable fluid pressure motor 46 simultaneously with the closing of the welding circuit and the formation of the weld. In this manner, no denting or deformation of the workpiece occurs because the movable electrode 78 on the electrode holder 58 and the piston 42 are free to move in the opposite direction to the support 166 for the fluid pressure motor 46 and the abutment electrode 130 until the electrodes 78 and 130 automatically find their proper positions against the opposite sides of the workpiece.

Moreover, the effective length of the composite shaft 120 may be increased or decreased in the manner described above by threading its rearward portion 110 into or out of its forward portion 116 after the nut 126 has been loosened and the locking or flattened portion 122 has been moved to the left to release it from the locking groove 124. The tension of the spring 102 is also adjustable by means of the set screw or abutment screw 98 and the entire welding gun 10 can be moved for adjustment purposes relatively to the table 12 by loosening the screws 14, sliding the bracket 26 along the T-block 20, and retightening the screws 14 when the desired adjustment has been made. The compression spring 102 normally acts to move the reciprocable support 166 together with the cylinder 38 and fixed electrode 130 to the right, so that the abutment electrode 130 normally engages the rearward surface of the workpiece placed between the abutment and movable electrodes 130 and 78 respectively.

What I claim is:

1. A welding gun which is self-adapting to the workpiece comprising a stationarily-arranged support, an abutment electrode holding structure reciprocably mounted on said support for travel relatively to said support toward and away from the workpiece in a direction transverse to the workpiece and carrying an abutment electrode holder, a movable electrode holding structure reciprocably mounted relatively to said abutment electrode holding structure and carrying a movable electrode holder aligned with said abutment electrode holder, and a motor operatively connected between said abutment electrode holding structure and said movable electrode holding structure for reciprocating said structures in opposite directions and consequently oppositely-reciprocating the electrodes held thereby relatively to one another and to the workpiece into pressing engagement with the opposite sides of the workpiece, said abutment electrode holding structure including a pair of relatively extensible members secured to one another in longitudinally overlapping relationship and movably mounted relatively to one another.

2. A welding gun which is self-adapting to the workpiece comprising a stationarily-arranged support, an abutment electrode holding structure reciprocably mounted on said support for travel relatively to said support toward and away from the workpiece in a direction transverse to the workpiece and carrying an abutment electrode holder, a movable electrode holding structure reciprocably mounted relatively to said abutment electrode holding structure and carrying a movable electrode holder aligned with said abutment electrode holder, and a motor operatively connected between said abutment electrode holding structure and said movable electrode holding structure for reciprocating said structures in opposite directions and consequently oppositely-reciprocating the electrodes held thereby relatively to one another and to the workpiece into pressing engagement with the opposite sides of the workpiece, said abutment electrode holding structure including a pair of relatively extensible members having an extensible threaded connection with one another in longitudinally overlapping relationship and movably mounted relatively to one another by fine increments of motion.

3. A welding gun which is self-adapting to the workpiece comprising a stationarily-arranged support, an abutment electrode holding structure reciprocably mounted on said support for travel relatively to said support toward and away from the workpiece in a direction transverse to the workpiece and carrying an abutment electrode holder, a movable electrode holding structure reciprocably mounted relatively to said abutment electrode holding structure and carrying a movable electrode holder aligned with said abutment electrode holder, and a motor operatively connected between said abutment electrode holding structure and said movable electrode holding structure for reciprocating said structures in opposite directions and consequently oppositely-reciprocating the electrodes held thereby relatively to one another and to the workpiece into pressing engagement with the opposite sides of the workpiece, said support having an elongated guide groove in the bottom thereof, a clamping member movably mounted in said groove for relative sliding motion between said clamping member and said support, and means for releasably clamping said clamping member to said support.

References Cited in the file of this patent
UNITED STATES PATENTS

| | | |
|---|---|---|
| 1,645,705 | Ledwinka | Oct. 18, 1927 |
| 2,190,692 | Bitler et al. | Feb. 10, 1940 |
| 2,341,133 | Weightman | Feb. 8, 1944 |
| 2,372,413 | Weightman | Mar. 27, 1945 |
| 2,487,262 | Mueller | Nov. 8, 1949 |
| 2,744,989 | Fagge | May 8, 1956 |